Nov. 17, 1925.

W. T. GORTON

BUFFER MECHANISM FOR MACHINE GUNS

Filed July 11, 1924

1,561,713

Inventor
Walter T. Gorton
By W. M. Roach
Attorney

Patented Nov. 17, 1925.

1,561,713

UNITED STATES PATENT OFFICE.

WALTER T. GORTON, OF THE UNITED STATES ARMY.

BUFFER MECHANISM FOR MACHINE GUNS.

Application filed July 11, 1924. Serial No. 725,439.

(GRANTED UNDER THE ACT OF MARCH 3, 1883; 22 STAT. L. 625.)

*To all whom it may concern:*

Be it known that I, WALTER T. GORTON, captain, Ordnance Department, United States Army, a citizen of the United States, and stationed at Springfield Armory, county of Hampden, and State of Massachusetts, have invented an Improvement in Buffer Mechanism for Machine Guns, of which the following is a specification.

The invention described herein may be used by the Government, or any of its officers or employees in prosecution of work for the Government, or by any other person in the United States, without payment to me of any royalty thereon, in accordance with the act of March 3, 1883.

The subject of this invention is a buffer mechanism for machine guns.

In using machine guns on aircraft, it is desirable to secure an extremely rapid rate of fire which results in additional strain on the recoiling portions of the gun. In order to reduce this strain to a minimum, it is essential that a highly efficient shock absorbing mechanism be provided which is capable of absorbing the shock in opposite directions to reduce vibration of the gun during firing. In converting an aircraft gun to a ground gun and vice versa, it is advantageous to decrease or increase the quantity of shock absorbing material equally with respect to both sides of the buffer plug.

My invention resides in providing a buffer mechanism which receives the impact of recoil at a central point and dispels or absorbs the shock by oppositely disposed cushioning members, which may be variably maintained in constant relation, as occasion may require. I, also, provide a novel and unique buffer plug and buffer cam maintained in rigid assembly, while permitting free camming action and adapted to prevent binding and tilting of the buffer cams.

To these and other ends, my invention consists in the construction, arrangement, and combination of elements, described hereinafter and pointed out in the claims forming a part of this specification.

A practical embodiment of my invention is illustrated in the accompanying drawing, in which, Fig. 1 is a longitudinal sectional view of the rear end of a machine gun showing the recoiling portions in contact with the buffer plug;

Figure 1:
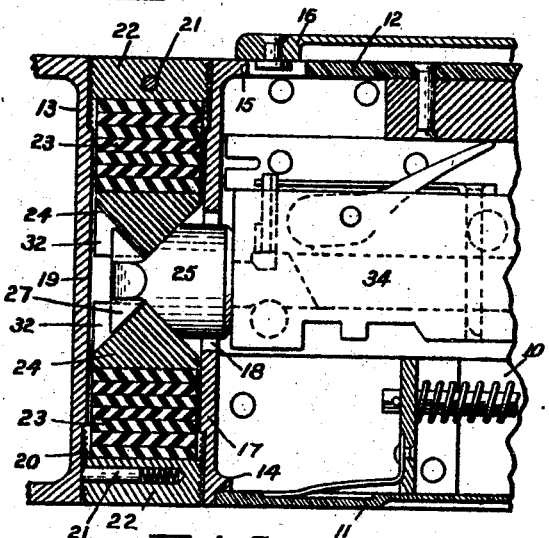
Figure 2:
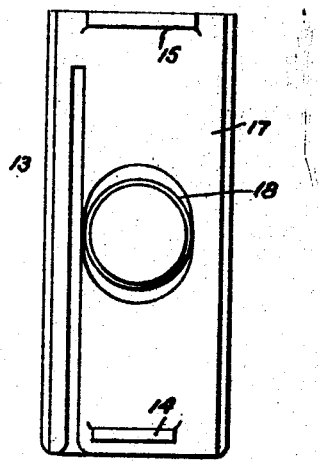
Fig. 2 is a front elevation of the back plate.
Figure 3:
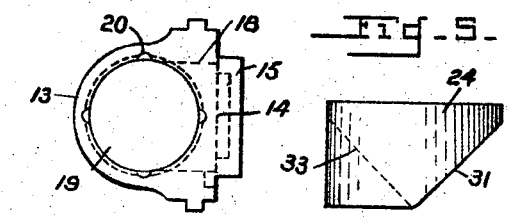
Fig. 3 is a plan view of the back plate.
Figure 5:
Fig. 5 is a detailed view in side elevation of the buffer cam.
Figure 6:
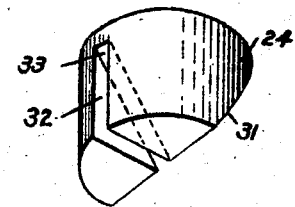
Fig. 6 is a perspective of the buffer cam.
Figure 4:
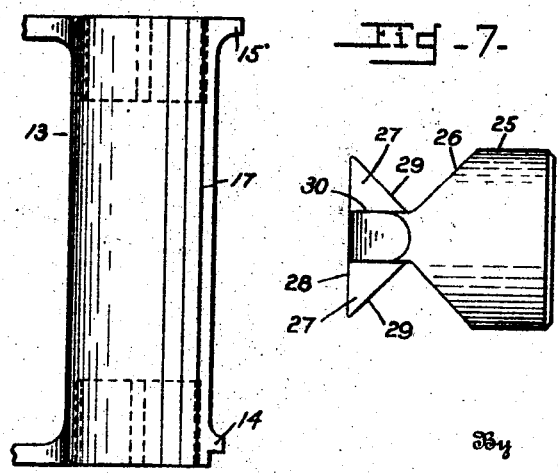
Fig. 4 is a detailed view in side elevation of the back plate.
Figure 7:
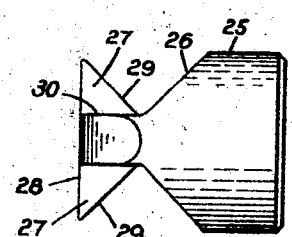
Fig. 7 is a detailed view in side elevation of the buffer plug.
Figure 8:
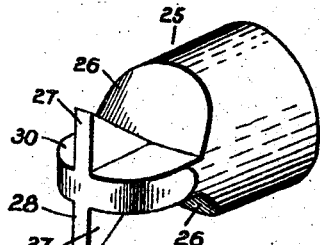
Fig. 8 is a perspective of the buffer plug.

Referring to the drawings by numerals of reference:

The receiver of a machine gun comprises an elongated rectilinear box including side plates 10, a bottom plate 11, and a top plate 12, riveted together in any suitable manner. The inner surfaces of the side plates adjacent their rear ends are formed with vertical grooves for the reception of a back plate 13, which is assembled to the receiver by a downward sliding movement until an extension 14 engages the bottom plate 11 to limit the downward movement, while a similar extension 15 on the upper part of the back plate is engageable by a latch 16 mounted on the top plate 12.

The forward wall 17 of the back plate is squared and formed with an aperture 18 intermediate its top and bottom for communication with the receiver, while the remainder of the back plate is rounded to form a cylindrical wall 19, which will hereinafter be referred to as the buffer portion of the back plate. The buffer portion 19 is counterbored and tapped at either end, the threads being interrupted by a plurality of rounded grooves 20 for selective reception of a plunger 21 carried in each of the adjusting screws 22.

Positioned between the adjusting screws 22 are resilient discs 23, seated on buffer cams 24 which engage a buffer plug 25, which is spaced from the rearmost wall of the buffer portion 19 and extends through the aperture 18 into the receiver where it may receive the impact of a bolt 34 on recoil movement.

The buffer plug 25 is a cylindrical member provided with opposite notches to form forwardly inclined surfaces 26 and wings 27 formed with squared ends 28 and rearwardly inclined edges 29, which merge with the notch surfaces 26 at right angles. The opposite wings and notches are spaced by converging guides 30 formed axially of the plug 25.

The buffer cams 24 are adapted to be carried on either side of the plug 25 and for the sake of clarity only one will be described. The buffer cam is a cylindrical member having an inclined surface 31 and a slot 32, which has a sliding fit on the wing 27 of the plug, to form an inclined surface 33 at right angles to the inclined surface 31 and parallel to the inclined edge 29 of the wing 27.

The buffer plug is assembled to the buffer cam by positioning its wing 27 in the slot 32 of the cam until the base of the cam rests upon the converging guides 30, at which time, the notch surfaces 26 and 31 may be slightly spaced.

By resting the base of the buffer cam on the guides 30, I avoid a tilting movement of the cam due to the thrust on initiating the shock absorbing mechanism. This construction permits the cam to be formed with a relatively shallow depth to provide greater space for the reception of the resilient discs 23.

The converging guides 27 are disposed at right angles to the axis of the buffer portion 19, so that the plug may be free to move inwardly upon impact of the bolt without interfering with the walls of the buffer portion 19.

If it is desired to increase or decrease the number of discs 23, an equal or unequal number may be added or removed and the adjusting screws 22 moved accordingly.

While in the foregoing there has been illustrated and described such combination and arrangement of elements, as constitute the preferred embodiment of my invention, it is nevertheless desired to emphasize the fact that interpretation of the invention should only be conclusive when made in the light of the subjoined claims.

I claim:

1. A buffer mechanism embodying a plug, said plug formed with opposite notches and opposite wings which are spaced by converging guides, and a plurality of buffer cams each of which is formed with an inclined surface and a slot converging with said surface at right angles thereto.

2. A buffer mechanism embodying a plug, said plug formed with opposite notches and opposite wings converging with the notches at right angles thereto, and a plurality of buffer cams each of which is formed with an inclined surface and a slot converging with said surface at right angles thereto.

3. A buffer mechanism embodying a plug, said plug formed with a notch and a wing converging with the notch at right angles thereto, a buffer cam, said cam formed with an inclined surface and a slot converging with said surface at right angles thereto.

4. A buffer mechanism for machine guns embodying a back plate, resilient members carried in opposite portions of the back plate, buffer cams interposed between the opposite groups of resilient members, each of said cams formed with converging inclined surfaces, a buffer plug engageable by the cams and formed with complementary inclined surfaces, and means for confining the resilient members on opposite sides of the cams.

5. A buffer mechanism for machine guns embodying a back plate, said plate formed with a cylindrical aperture extending from top to bottom, opposite groups of cushioning members carried by the plate, buffer cams interposed between said groups of cushioning members, a buffer plug operatively engaging said cams and means for variably confining an equal or unequal quantity of cushioning members on opposite sides of the cams.

6. A buffer mechanism for machine guns embodying a back plate, said plate formed with an aperture, opposite groups of cushioning members carried by the plate, buffer cams interposed between said groups of cushioning members, and a buffer plug interposed between the buffer cams and extending through the aperture in the back plate.

7. A shock absorbing mechanism, embodying a housing, resilient members carried in opposite portions of the housing, means interposed between the resilient members for compressing the same, and means for variably confining an equal or unequal quantity of resilient members on either side of the compressing means.

8. A shock absorbing mechanism embodying a housing, resilient members carried in opposite portions of the housing, means interposed between the resilient members for compressing the same, and mean for closing the housing.

9. A shock absorbing mechanism, embodying a buffer plug and buffer cams engaging opposite sides of said plug and free to be moved in opposite directions.

10. A shock absorbing mechanism embodying a buffer plug and a buffer cam, said plug and cam having dual interengaging inclined surfaces, the inclined surfaces of each member being at right angles.

11. A shock absorbing mechanism embodying a buffer plug and a buffer cam slidably associated and interlocked therewith.

12. A shock absorbing mechanism embodying a buffer plug and buffer cams at right angles to said plug, said plug and cams formed and assembled to prevent axial rotation of each other.

WALTER T. GORTON.